(12) United States Patent
Huang

(10) Patent No.: US 9,633,451 B2
(45) Date of Patent: Apr. 25, 2017

(54) IMAGE DATA PROCESSING METHOD OF MULTI-LEVEL SHUFFLES FOR MULTI-FORMAT PIXEL AND ASSOCIATED APPARATUS

(71) Applicant: MediaTek Singapore Pte. Ltd., Singapore (SG)

(72) Inventor: Hsilin Huang, Cupertino, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 166 days.

(21) Appl. No.: 14/178,302

(22) Filed: Feb. 12, 2014

(65) Prior Publication Data

US 2015/0228256 A1 Aug. 13, 2015

(51) Int. Cl.
*G09G 5/39* (2006.01)
*G06T 9/00* (2006.01)
*H04N 19/42* (2014.01)
*H04N 19/88* (2014.01)
*G09G 5/02* (2006.01)
*H04N 19/186* (2014.01)

(52) U.S. Cl.
CPC ............ *G06T 9/00* (2013.01); *H04N 19/42* (2014.11); *H04N 19/88* (2014.11); *G09G 5/02* (2013.01); *G09G 2340/02* (2013.01); *G09G 2340/06* (2013.01); *H04N 19/186* (2014.11)

(58) Field of Classification Search
None
See application file for complete search history.

(56) References Cited

U.S. PATENT DOCUMENTS

| | | | | |
|---|---|---|---|---|
| 5,341,318 A * | 8/1994 | Balkanski | ............... | H04N 19/42 358/426.13 |
| 6,154,493 A * | 11/2000 | Acharya | ................ | H04N 1/648 348/398.1 |
| 6,683,979 B1 * | 1/2004 | Walker | .................... | G06T 9/005 358/539 |
| 2009/0147020 A1 * | 6/2009 | Sellers | ................... | H04N 9/642 345/603 |
| 2010/0142813 A1 * | 6/2010 | Abdo | ..................... | H04N 1/646 382/166 |
| 2013/0057567 A1 * | 3/2013 | Frank | .................... | G06F 3/1454 345/589 |
| 2013/0321700 A1 * | 12/2013 | Cote | ....................... | G06T 7/408 348/453 |
| 2013/0332556 A1 * | 12/2013 | Chen | ...................... | H04L 47/10 709/208 |

\* cited by examiner

*Primary Examiner* — Kee M Tung
*Assistant Examiner* — Yi Wang
(74) *Attorney, Agent, or Firm* — Winston Hsu; Scott Margo

(57) ABSTRACT

An image data processing method is provided. The image data processing method includes the following steps: receiving image data, wherein the image data is in a first pixel format; shuffling the image data according to a relationship between the first pixel format and a second pixel format to generate shuffled data; and compressing the shuffled data by a compression module which is suitable for compressing image data in the second pixel format so as to generate compressed data.

12 Claims, 4 Drawing Sheets

IMAGE DATA PROCESSING METHOD OF MULTI-LEVEL SHUFFLES FOR MULTI-FORMAT PIXEL AND ASSOCIATED APPARATUS

BACKGROUND

The disclosure relates generally to an image data processing method, and more specifically, to an image data shuffling method and an associated apparatus which are able to improve the compression ratio for multiple kinds of pixel formats, and a corresponding image data de-shuffling method and apparatus.

The scale of graphics processing units (GPU) is growing enormously, as a result of supporting various different image data formats. Some modules in the GPU may need to be duplicated and fine-tuned in order to support dedicated data paths corresponding to the different image data formats. For instance, a GPU supporting different image data formats may need 4 different built-in compression modules to achieve high compression ratios for all formats. The resultant hardware cost and the routing issues introduced therein may soon reach a point that is nearly unacceptable. If, however, the dedicated data paths are abandoned under certain compromises, the compression ratios obtained by performing compression dedicated to a certain kind of image data upon these different image data formats may degrade hugely. This dilemma in the field of image data processing requires urgent attention.

SUMMARY

In accordance with exemplary embodiments of the invention, image data processing methods and related apparatuses are proposed to solve the above-mentioned problems.

According to a first embodiment of the invention, an image data processing method is disclosed. The image data processing method comprises: receiving image data, wherein the image data is in a first pixel format; shuffling the image data according to a relationship between the first pixel format and a second pixel format to generate shuffled data; and compressing the shuffled data by a compression module which is suitable for compressing image data in the second pixel format so as to generate compressed data.

According to a second embodiment of the invention, an image data processing apparatus is disclosed. The image data processing apparatus comprises: a receiving module for receiving image data in a first pixel format; a data shuffling module, configured to shuffle the image data according to a relationship between the first pixel format and a second pixel format to generate shuffled data; and a compression module, configured to compress the shuffled data to generate a compressed data, wherein the compression module is suitable for compressing image data in the second pixel format.

According to a third embodiment of the invention, an image data processing method is disclosed. The image data processing method comprises: receiving compressed image data; decompressing the compressed image data by a decompression module which is suitable for decompressing image data in a second pixel format so as to generate decompressed image data; and de-shuffling the decompressed image data according to a relationship between a first pixel format and the second pixel format to generate an image data.

According to a fourth embodiment of the invention, an image data processing apparatus is disclosed. The image data processing apparatus comprises: a receiver module for receiving compressed image data; a decompressing module, configured to decompress the compressed image data by a decompression module which is suitable for decompressing image data in a second pixel format so as to generate decompressed image data; and a data de-shuffling module, configured to de-shuffle the decompressed image data according to a relationship between a first pixel format and the second pixel format to generate image data.

These and other objectives of the invention will no doubt become obvious to those of ordinary skill in the art after reading the following detailed description of the preferred embodiment that is illustrated in the various figures and drawings.

DETAILED DESCRIPTION

Figure 1:
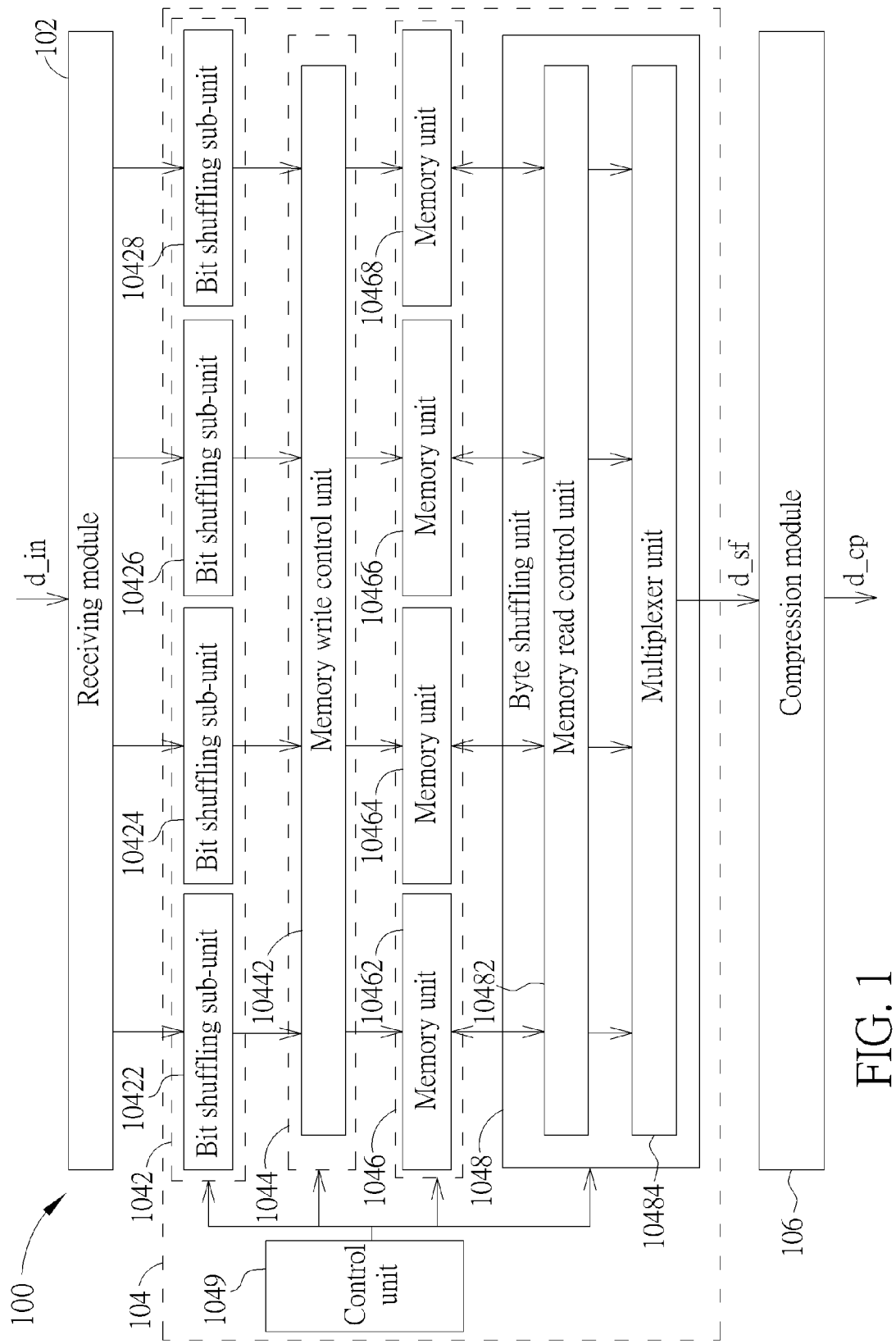
FIG. 1 is a diagram illustrating an image data processing apparatus according to an embodiment of the invention.

Certain terms are used throughout the description and following claims to refer to particular components. As one skilled in the art will appreciate, manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

In multimedia, there are different image formats which support different color depths or bits per pixel of different images, such as the RGB color model (The RGB color model is an additive color model in which red, green, and blue light are added together in various ways to reproduce a broad array of colors. The name of the model comes from the initials of the three additive primary colors, red, green, and blue) and the YUV color model (YUV is a color space typically used as part of a color image pipeline. It encodes a color image or video taking human perception into account, allowing reduced bandwidth for chrominance components, thereby typically enabling transmission errors or compression artifacts to be more efficiently masked by the human perception than using a "direct" RGB-representation). The main purpose of the RGB color model is for sensing, representation, and display of images in electronic systems, such as televisions and computers, though it has also been used in conventional photography. Before the electronic age, the RGB color model already had a solid theory behind it, based on human perception of colors. A color in the RGB color model is described by how much each of the three colors is included therein. The color is expressed as an RGB triplet (r, g, b), each component of which can vary from zero to a defined maximum value (e.g.

255). If all the components are at zero, the result is black; if all are at maximum, the result is the brightest white that can be represented.

The RGB color model is the most common way to encode color in computing. Several different binary digital representations are currently in use. The main characteristic of all representations is the quantization of the possible values per component (technically a sample/signal) using integer numbers within a certain range (usually from 0 to some power of two minus one ($2^{n-1}$)) to fit them into some bit groupings. Encodings of 1, 2, 4, 5, 8 and 16 bits per color are commonly found; the total number of bits used for an RGB color is typically called the color depth and a specific representation of a pixel is typically called the pixel format. In the following, typically used pixel formats are employed for illustrative purposes.

In a case where a built-in compression module of a GPU is fine-tuned based on the RGBA8 pixel format, an exemplary compression ratio of 60.02% is obtained when RGBA8 image data is inputted into the compression module. If input data of other pixel formats are fed into the compression module fine-tuned for the RGBA8 pixel format, the corresponding compression ratios will be degraded. Please refer to Table 1 below, which indicates compression ratios obtained by applying the compression module fine-tuned for the RGBA8 format upon other exemplary pixel formats.

TABLE 1

| Bpp | Sized Internal Format | Base Internal Format | R bits | G bits | B bits | A bits | Compression Ratio |
|---|---|---|---|---|---|---|---|
| 8 | R8 | R | 8 | | | | 36.91% |
| 16 | RG88 | RG | 8 | 8 | | | 36.50% |
| 16 | RGB565 | RGB | 5 | 6 | 5 | | 21.33% |
| 16 | RGBA4 | RGBA | 4 | 4 | 4 | 4 | 57.04% |
| 16 | RGB5_A1 | RGBA | 5 | 5 | 5 | 1 | 33.04% |
| 32 | RGBA8 | RGBA | 8 | 8 | 8 | 8 | 60.02% |
| 32 | RGB10_A2 | RGBA | 10 | 10 | 10 | 2 | 24.18% |
| 16 | R16F | R | f16 | | | | 44.14% |
| 32 | RG16F | RG | f16 | f16 | | | 37.05% |
| 64 | RGBA16F | RGBA | f16 | f16 | f16 | f16 | 31.77% |
| 32 | R32F | R | f32 | | | | 51.73% |
| 64 | RG32F | RG | f32 | f32 | | | 42.70% |
| 128 | RGBA32F | RGBA | f32 | f32 | f32 | f32 | 35.72% |

From the above, it is obvious that the highest compression ratio corresponds to RGBA8. It can be found that compression ratios of the remaining formats bear a wide range of variation. For instance, the second-highest compression ratio corresponds to RGBA4 and is averaged as 57.04%, which is not far from the performance of RGBA8, but the lowest compression ratio corresponds to RGB565 and is averaged as 21.33%. One can perceive that the structure of the RGBA4 is similar to that of the RGBA8 since two RGBA4 pixels contain exactly the same amount of R, G, B and A components as one RGBA8 pixel. On the other hand, RGB565 does not contain the A component and is less similar with RGBA8. As a result, a simple deduction can be made that the pixel formats similar to RGBA8, such as RGBA4, can still maintain a competitive level of compression ratio but using the compression module suitable or fine tuned for RGBA8 to perform compression upon pixel formats which are quite different from RGBA8 will result in poor compression ratios.

To deal with input data of different pixel formats, one can employ a dedicated compression engine for each of the pixel formats. For example, when the input data is in a first pixel format, use a dedicated compression engine for the first pixel format to compress the input data. And, when the input data is switched to a second pixel format, use a dedicated compression engine for the second pixel format to compress the input data. Though this approach keeps high compression ratios, its cost may be unacceptable.

The invention maintains a competitive compression result but uses one compression engine designed for a particular pixel format. The concept is to shuffle contents of the input data in accordance with the particular pixel format to generate shuffled data similar to the particular pixel format. By feeding the shuffled data to the compression engine, the compression ratios may approach that resulted from adopting a dedicated compression engine for each of the pixel formats of the input data. In the following, RGBA8 is taken as an example of the particular pixel format and descriptions of how the input data under the different pixel formats is shuffled will be given. For each of the pixel formats, the input data size is set to 1 k-bit. However, these are only for illustrative purposes and by no means prohibit combinations of other pixel formats as the particular pixel format and other input data sizes.

For the input data of R8 (the pixel format therein={R[7:0]}), it is obvious that three extra components are missing compared with RGBA8 (the pixel format therein={R[7:0], G[7:0], B[7:0], A[7:0]}). Hence, three extra components (G8, B8 and A8) need to be added to make an extension to the base internal format. However, suppose that the neighboring three pixels in the R8 pixel format are directly used as the three extra components, i.e. perceive consecutive four R8 pixels to be an RGBA8-like pixel, the resulting compression ratio will be inevitably degraded. One major reason is that two R8 components in two adjacent RGBA8-like pixels actually come from two R8 pixels separated by three other R8 pixels instead of from two adjacent R8 pixels. Thus, the delta difference of such generated RGBA8-like pixels will not be minimal and the compression ratio may be hugely degraded. Therefore, according to an embodiment, for a 1 k-bit R8 image data R8_data[1023:0], the rearranged format R8_data' [1023:0] may be formulated as:

$R8\_data'[32*(32-n)-1:32*(32-n-1)]=\{R8\_data[1023-8n:1016-8n],R8\_data[767-8n:760-8n],R8\_data[511-8n:504-8n],R8\_data[255-8n:248-8n]\}$, for $n=0$-31}. (1.a)

By replacing n from 0 to 31 to expand (1.a), we get:

$R8\_data'[1023:0]=\{R8\_data[1023:1016],R8\_data[767:760],R8\_data[511:504],R8\_data[255:248],R8\_data[1015:1008],R8\_data[759:752],R8\_data[503:496],R8\_data[247:240], \ldots ,R8\_data[775:768],R8\_data[519:512],R8\_data[263:256],R8\_data[7:0]\}$. (1.b)

It can be seen that, for some of the originally adjacent pixels in R8_data, three bytes are inserted in between to generate the R8_data' with a data arrangement similar to the RGBA8 pixel format. For instance, R8_data[1023:1016] and R8_data[1015:1008] are adjacent pixels, and are separated by R8_data[767:760], R8_data[511:504] and R8_data [255:248]. It should be noted that the method of shuffling one image datum according to a relationship between two pixel formats to generate a shuffled datum is not limited to the aforesaid example.

Compressing R8_data' [1023:0] by a compression module which is suitable for compressing image data of RGBA8 format can obtain an improved compression ratio of 50.60%.

For the input data of RG88 (the pixel format of RG88={R[7:0]}, G[7:0]), it can be seen that two extra components are missing compared with RGBA8 (the pixel format of RGBA8={R[7:0], G[7:0], B[7:0], A[7:0]}). In view of format alignment, two extra components (B8 and A8) need to be added to make an extension of the base internal format. However, directly using the neighboring pixel of an RG88 pixel may also hugely degrade the compression ratio for a similar reason as explained in the case of the R8 input data. Therefore, according to an embodiment, the rearranged format of a 1 k-bit RG88 image data RG88_data[1023:0] may be formulated as:

$$RG88\_data'[32*(32-n)-1:32*(32-n-1)]=\{RG88\_data[1023-16n:1008-16n], RG88\_data[511-16n:496-16n]\}, \text{ for } n\text{=0-31}\} \quad (2.a)$$

By replacing n from 0 to 31 to expand (2.a), we get:

$$RG88\_data'[1023:0]=\{RG88\_data[1023:1008], RG88\_data[511:496], RG88\_data[1007:992], RG88\_data[495:480], \ldots, RG88\_data[527:512], RG88\_data[15:0]\}. \quad (2.b)$$

It can be seen that some of the originally adjacent pixels in RG88_data are separated by two other bytes in the RG88_data', in a way that is similar to the RGBA8 format. For instance, RG88_data[1023:1008] and RG88_data[1007:992] are adjacent pixels, and are separated by RG88_data[511:496] (RG88_data[511:496] includes two bytes) to generate RG88_data'.

Compressing RG88_data' [1023:0] by a compression module which is suitable/fine-tuned for compressing image data of RGBA8 can therefore obtain an improved compression ratio of 50.38%.

For the input data of RGB565 (the pixel format of RGB565={R[4:0], G[5:0], B[4:0]}), it is obvious that the data structure has a significant difference when compared with RGBA8 (the pixel format of RGBA8={R[7:0], G[7:0], B[7:0], A[7:0]}). In view of format alignment, the pixel format of RGB565 may be rearranged (or so called bit level shuffled) as: RGB565'={G[5], R[4], R[3], G[3], R[2], R[1] G[1], R[0], B[4], G[4], B[3], B[2], G[2], B[1], B[0], G[0]} (3), wherein the G[5:0] is broken up and evenly distributed in the first half and the second half of the rearranged image data structure. The pixel format of RGB565 turns into two main parts, wherein the first half consists of full components of R and a portion of components of G, and the second half consists of full components of B and a remaining portion of components of G. Therefore, formula (2.a) of the pixel format of RG88 can be applied to RGB565' since the structure of the pixel format of RGB565' is adjusted according to that of RG88. It should be noted that the concept of breaking up the G component is not limited to the aforesaid method. Those skilled in the pertinent art should readily appreciate that numerous modifications and alterations of the device and method may be made while retaining the teachings of the invention. These modifications and alterations all fall within the scope of the invention.

Compressing RGB565' by a compression module which is suitable/fine-tuned for compressing image data of RGBA8 can therefore obtain an improved compression ratio of 51.63%, as compared with the result of 21.33% without the aforementioned shuffling.

For the input data of RGBA4 (the pixel format of RGBA4={R[3:0], G[3:0], B[3:0], A[3:0]}), it is obvious that the data structure is similar but still has certain differences when compared with RGBA8 (the pixel format of RGBA8={R[7:0], G[7:0], B[7:0], A [7:0]}). Hence, in view of format alignment, the pixel format of RGBA4 may be rearranged as: RGBA4'={R[3], G[3], R[2], G[2], R[1], G[1], R[0], G[0], B[3], A[3], B[2], A[2], B[1], A[1], B[0], A[0]} (4), wherein the components R[3:0] and G[3:0] are broken up and evenly distributed in the first half of the rearranged image data structure, and the components B[3:0] and A[3:0] are broken up and evenly distributed in the second half of the rearranged image data structure. The pixel format of RGBA4 turns into two main parts, wherein the first half consists of full components of R and G, and the second half consists of full components of B and A. Therefore, formula (2.a) of the pixel format of RG88 can be applied to RGBA4' since the structure of the pixel format of RGBA4' is modified according to that of RG88. It should be noted that the concept of breaking up the R, G, B and A components is not limited to the aforesaid method. Those skilled in the pertinent art should readily appreciate that numerous modifications and alterations of the device and method may be made while retaining the teachings of the invention. These modifications and alterations all fall within the scope of the invention.

Compressing RGBA4' by a compression module which is suitable/fine-tuned for compressing image data of RGBA8 can therefore obtain an improved compression ratio of 64.41%, as compared with the result of 57.04% without the aforementioned shuffling. The improvement is not that obvious as aforesaid other pixel formats and this is expected because RGBA4 itself bears higher data arrangement similarity with RGBA8.

In the foregoing disclosure, examples of how some different pixel formats in Table 1 are shuffled to a particular pixel format with respective mathematical formulations are given. Other pixel formats in Table 1 are not discussed in detail for the sake of brevity as it is not hard to derive respective mathematical formulations based on the principles presented above. However, for many advanced image processing applications, in order to meet the stringent computing requirement such as high throughput and speed, customized hardware implementation is inevitable instead of general purpose digital signal processors (DSP) or software realizations. As such, gate count and routing complexity may be some major issues to tackle. Without sophisticated design, implementing all the aforementioned shuffling process with 1 k-bit data size would either cause physical design problems or result in huge hardware area since the routing complexity itself may be too high, let alone to say the data size might be much larger than 1 k-bit. In the following, embodiments of hardware architecture that are able to realize data shuffling of different pixel formats while results in low routing complexity and area overhead will be introduced. To illustrate the embodiments, we directly use the aforementioned exemplary pixel formats with input image data size of 1-k bit; however, this is only for illustrative purpose and by no means restricts the scope of the invention thereto.

Please refer to FIG. 1, which is a diagram illustrating an image data processing apparatus 100 according to an embodiment of the invention. The image data processing apparatus 100 comprises a receiving module 102, a data shuffling module 104 and a compression module 106, wherein the receiving module 102 is for receiving image data d_in in a first pixel format. The first pixel format may be one of pixel formats of R8, RG88, RGB565, RGBA4, RGB5_A1, RGB10_A2, R16F, RG16F, RGBA16F, R32F, RG32F, RGBA8 and RGBA32F, but this is not a limitation of the invention. The data shuffling module 104 is configured to shuffle the image data d_in according to a relationship between the first pixel format and a second pixel format, e.g. RGBA8, to generate shuffled data d_sf. A control unit 1049 inside the data shuffling module 104 configures other units in the data shuffling module 104 in respect of the format transformation according to the relationship between the first and second pixel format. The compression module 106 suitable for the second pixel format is configured to compress the shuffled data d_sf to generate compressed data d_cp. In this embodiment, the compression module 106 is suitable/fine tuned for performing data compressing of image data in the RGBA8 pixel format. Please note that the pixel format of RGBA8 is employed here as the second format to represent a general case, but is not a limitation of the invention. In an alternative design, the compression module 106 may be suitable/fine tuned for performing data compressing of image data not in the RGBA8 pixel format. The same objective of improving the compression ratio by doing data shuffling is achieved through the exemplary architecture shown in FIG. 1. Persons having ordinary skill in the art should readily observe that numerous modifications and alterations of the device and method may be made while retaining the teachings of the invention.

For hardware implementation consideration, image data d_in may need to be broken up for further operation. As an example, the 1 k-bit image data d_in may consist of 8 sections, wherein each section is 128 bits consisting of 4 sub-sections, each sub-section containing a DWORD, e.g. 32 bits. Firstly, consider the d_in in the pixel format of R8.

According to previous paragraphs pertaining to the transformation from R8 to RGBA8 and (1.b), the control unit 1049 bypasses a bit shuffling unit 1042 in the case of R8 to RGBA8 format transformation. This is because none of bit level data shuffling is present in (1.b). As a result, the bit shuffling unit 1042 is bypassed and the image data d_in is directly inputted into a DWORD shuffling unit 1044.

The DWORD shuffling unit 1044 includes a memory write control unit 10442, which is configured to receive the image data d_in of R8 and store the image data d_in section by section (128 bits) into a memory module 1046 according to a DWORD mapping information. As shown in FIG. 1, the memory module 1046 includes 4 memory units 10462-10468, where each memory unit has 8 entries, and each entry is capable of storing one of the sub-sections of the image data d_in. The DWORD mapping information is also configured according to R8 and maps the 4 sub-sections (32 bits) of one of the 8 sections of the image data d_in to the same entry of the 4 memory units 10462-10468. Please refer to Table 2 below, which indicates the DWORD mapping information of the image format of R8.

Table 2 indicates the rearrangement of the DWORD mapping information of the image format of R8, wherein the rows 7-0 indicate 8 sections of the image data d_in, and the columns 15-0 indicate 16 bytes of each section of the image data d_in. Regarding the notation for each byte, the byte corresponding to row 7 and column 15, for example, is f127=byte127=bits[1023:1016]. Please note that the bytes of the DWORD mapping information of the image format of R8 may be partially out of order. For instance, bytes corresponding to the row 5 and columns 12 and 11 are f80 and f95. From the DWORD's point of view, the original row 5 (section 5) of the 1 k-bit image data d_in should be f95-f80, but after the DWORD shuffling according to Table 1, the rearranged row 5 is modified to f83-f80, f95-f84. From the hardware's point of view, the bytes corresponding to rows 7-0 and columns 15-12 are stored into 8 entries of the memory unit 10462, wherein the bytes corresponding to rows 7-0 and columns 11-8 are stored into 8 entries of the memory unit 10464, the bytes corresponding to rows 7-0 and columns 7-4 are stored into 8 entries of the memory unit 10466, and the bytes corresponding to rows 7-0 and columns 3-0 are stored into 8 entries of the memory unit 10468.

The memory module 1046 is connected to a byte shuffling unit 1048, which consists of a memory read control unit 10482 and a multiplexer unit 10484. The memory read control unit 10482 is configured to access the 4 memory units 10462-10468 according to a byte mapping information of the image format of R8, to output an accessed data, where the accessed entry in each of the 4 memory units 10462-10468 is different. Please refer to Table 3 and 4 below, which indicate the byte mapping information of the image format of R8 and the multiplexing rules of the multiplexer unit 10484, respectively. The notation "C0-C7" represents cycle 0-cycle 7.

TABLE 3

| | memory unit 10462 | memory unit 10464 | memory unit 10466 | memory unit 10468 |
|---|---|---|---|---|
| C7 | 7 | 5 | 3 | 1 |
| C6 | 1 | 7 | 5 | 3 |
| C5 | 3 | 1 | 7 | 5 |
| C4 | 5 | 3 | 1 | 7 |
| C3 | 6 | 4 | 2 | 0 |
| C2 | 0 | 6 | 4 | 2 |
| C1 | 2 | 0 | 6 | 4 |
| C0 | 4 | 2 | 0 | 6 |

TABLE 2

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 7 | f127 | f126 | f125 | f124 | f123 | f122 | f121 | f120 | f119 | f118 | f117 | f116 | f115 | f114 | f113 | f112 |
| 6 | f111 | f110 | f109 | f108 | f107 | f106 | f105 | f104 | f103 | f102 | f101 | f100 | f99 | f98 | f97 | f96 |
| 5 | f83 | f82 | f81 | f80 | f95 | f94 | f93 | f92 | f91 | f90 | f89 | f88 | f87 | f86 | f85 | f84 |
| 4 | f67 | f66 | f65 | f64 | f79 | f78 | f77 | f76 | f75 | f74 | f73 | f72 | f71 | f70 | f69 | f68 |
| 3 | f55 | f54 | f53 | f52 | f51 | f50 | f49 | f48 | f63 | f62 | f61 | f60 | f59 | f58 | f57 | f56 |
| 2 | f39 | f38 | f37 | f36 | f35 | f34 | f33 | f32 | f47 | f46 | f45 | f44 | f43 | f42 | f41 | f40 |
| 1 | f27 | f26 | f25 | f24 | f23 | f22 | f21 | f20 | f19 | f18 | f17 | f16 | f31 | f30 | f29 | f28 |
| 0 | f11 | f10 | f9 | f8 | f7 | f6 | f5 | f4 | f3 | f2 | f1 | f0 | f15 | f14 | f13 | f12 |

TABLE 4

| | | | | | byte order | | | | | | | | | | |
|---|---|---|---|---|---|---|---|---|---|---|---|---|---|---|---|
| C7 | 15 | 11 | 7 | 3 | 14 | 10 | 6 | 2 | 13 | 9 | 5 | 1 | 12 | 8 | 4 | 0 |
| C6 | 11 | 7 | 3 | 15 | 10 | 6 | 2 | 14 | 9 | 5 | 1 | 13 | 8 | 4 | 0 | 12 |
| C5 | 7 | 3 | 15 | 11 | 6 | 2 | 14 | 10 | 5 | 1 | 13 | 9 | 4 | 0 | 12 | 8 |
| C4 | 3 | 15 | 11 | 7 | 2 | 14 | 10 | 6 | 1 | 13 | 9 | 5 | 0 | 12 | 8 | 4 |
| C3 | 15 | 11 | 7 | 3 | 14 | 10 | 6 | 2 | 13 | 9 | 5 | 1 | 12 | 8 | 4 | 0 |
| C2 | 11 | 7 | 3 | 15 | 10 | 6 | 2 | 14 | 9 | 5 | 1 | 13 | 8 | 4 | 0 | 12 |
| C1 | 7 | 3 | 15 | 11 | 6 | 2 | 14 | 10 | 5 | 1 | 13 | 9 | 4 | 0 | 12 | 8 |
| C0 | 3 | 15 | 11 | 7 | 2 | 14 | 10 | 6 | 1 | 13 | 9 | 5 | 0 | 12 | 8 | 4 |

For cycle 0, the entry 4 of the memory unit 10462, the entry 2 of the memory unit 10464, the entry 0 of the memory unit 10466, and the entry 6 of the memory unit 10468 are read out respectively in accordance with Table 3, i.e. {f67-f64, f35-f32, f3-f0, and f99-f96}, and the 4 DOWRDs are inputted into the multiplexer unit 10484. The resultant shuffled data d_sf is finally generated as {f99, f67, f35, f3, f98, f66, f34, f2, f97, f65, f33, f1, f96, f64, f32 and f0} under the control of a multiplexer control signal which operates in accordance with the byte order of cycle 0, {3, 15, 11, 7, 2, 14, 10, 6, 1, 13, 9, 5, 0, 12, 8, 4}, shown in the last row in Table 4.

For cycle 1, the entry 2 of the memory unit 10462, the entry 0 of the memory unit 10464, the entry 6 of the memory unit 10466, and the entry 4 of the memory unit 10468 are read out respectively in accordance with Table 3, i.e. {f39-f36, f7-f4, f103-f100, and f71-f68}, and the 4 DOWRDs are inputted into the multiplexer unit 10484. The resultant shuffled data d_sf is finally generated as {f103, f71, f39, f7, f102, f70, f38, f6, f101, f69, f37, f5, f100, f68, f36 and f4} under the control of a multiplexer control signal which operates in accordance with the byte order of cycle 1, {7, 3, 15, 11, 6, 2, 14, 10, 5, 1, 13, 9, 4, 0, 12, 8}, shown in the penultimate row in Table 4.

For cycle 2, the entry 0 of the memory unit 10462, the entry 6 of the memory unit 10464, the entry 4 of the memory unit 10466, and the entry 2 of the memory unit 10468 are read out respectively in accordance with Table 3, i.e. {f11-f8, f107-f104, f75-f72, and f43-f40}, and the 4 DOWRDs are inputted into the multiplexer unit 10484. The resultant shuffled data d_sf is finally generated as {f107, f75, f43, f11, f106, f74, f42, f10, f105, f73, f41, f9, f104, f72, f40 and f8} under the control of a multiplexer control signal which operates in accordance with the byte order of cycle 2, {11, 7, 3, 15, 10, 6, 2, 14, 9, 5, 1, 13, 8, 4, 0, 12}, shown in the bottom third row in Table 4.

Since the shuffled data d_sf for following cycles 3-7 can be known by referring to Table 3 and Table 4, the detailed in cycle 7 for example, during this cycle, three bytes of f95, f63 and f31 respectively indicated as R8_data[767:760], R8_data and R8_data[255:248] in (1.b) are inserted to be outputted between f127 and f126 that respectively represent R8_data[1023:1016] and R8_data[1015:1008] in (1.b). Thus, the aforementioned hardware operation does implement the data shuffling according to the relationship between the R8 and RGBA8 pixel formats.

Lastly, the compression module 106 suitable/fine-tuned for compressing image data in the pixel format of RGBA8 is configured to compress the shuffled data d_sf to generate the compressed data d_cp. According to previous disclosure, the resultant compression ratio is considerably improved to 50.60% as compared with 36.91% derived by feeding directly the image data d_in of R8 to the compression module 106.

For RG88, please refer to FIG. 1 again. According to previous paragraphs pertaining to the transformation from RG88 to RGBA8 and (2.b), the control unit 1049 bypasses the bit shuffling unit 1042 in the case of RG88 to RGBA8 format transformation. This is because none of bit level data shuffling is present in (2.b). As a result, the bit shuffling unit 1042 is bypassed and the image data d_in is directly inputted into the DWORD shuffling unit 1044. The memory write control unit 10442 is configured to receive the image data d_in of RG88 and store the image data d_in section by section (128 bits) into the memory module 1046 according to a DWORD mapping information. As shown in FIG. 1, the memory module 1046 includes the 4 memory units 10462-10468, where each memory unit has 8 entries, and each entry is capable of storing one of the sub-sections of the image data d_in. The DWORD mapping information is also configured according to RG88 and maps the 4 sub-sections (32 bits) of one of the 8 sections of the image data din to the same entry of the 4 memory units 10462-10468. Please refer to Table 5 below, which indicates the DWORD mapping information of the image format of RG88.

TABLE 5

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 7 | f127 | f126 | f125 | f124 | f123 | f122 | f121 | f120 | f119 | F118 | f117 | f116 | f115 | f114 | f113 | f112 |
| 6 | f111 | f110 | f109 | f108 | f107 | f106 | f105 | f104 | f103 | F102 | f101 | f100 | f99 | f98 | f97 | f96 |
| 5 | f95 | f94 | f93 | f92 | f91 | f90 | f89 | f88 | f87 | F86 | f85 | f84 | f83 | f82 | f81 | f80 |
| 4 | f79 | f78 | f77 | f76 | f75 | f74 | f73 | f72 | f71 | F70 | f69 | f68 | f67 | f66 | f65 | f64 |
| 3 | f55 | f54 | f53 | f52 | f51 | f50 | f49 | f48 | f63 | F62 | f61 | f60 | f59 | f58 | f57 | f56 |
| 2 | f39 | f38 | f37 | f36 | f35 | f34 | f33 | f32 | f47 | F46 | f45 | f44 | f43 | f42 | f41 | f40 |
| 1 | f23 | f22 | f21 | f20 | f19 | f18 | f17 | f16 | f31 | F30 | f29 | f28 | f27 | f26 | f25 | f24 |
| 0 | f7 | f6 | f5 | f4 | f3 | f2 | f1 | f0 | f15 | F14 | f13 | f12 | f11 | f10 | f9 | f8 | descriptions are omitted here for brevity. By observing the outputting pattern of the shuffled data d_sf from cycle 0 to cycle 7, it can be found that the data rearrangement formulated as (1.b) is indeed achieved. Take the outputting of d_sf Table 5 indicates the rearrangement of the DWORD mapping information of the image format of RG88, wherein the rows 7-0 indicate 8 sections of the image data d_in, and the columns 15-0 indicate 16 bytes of each section of the image data d_in. Regarding the notation for each byte, the byte corresponding to row 7 and column 15, for example, is f127=byte127=bits[1023:1016]. Please note that the bytes of the DWORD mapping information of the image format of RG88 may be partially out of order. For instance, bytes corresponding to the row 3 and columns 8 and 7 are f48 and f63. From the DWORD's point of view, the original row 3 (section 3) of the 1 k-bit image data d_in should be f63-f48, but after the DWORD shuffling according to Table 5, the rearranged row 3 is modified to f55-f48, f63-f56. From the hardware's point of view, the bytes corresponding to rows 7-0 and columns 15-12 are stored into 8 entries of the memory unit 10462, the bytes corresponding to rows 7-0 and columns 11-8 are stored into 8 entries of the memory unit 10464, the bytes corresponding to rows 7-0 and columns 7-4 are stored into 8 entries of the memory unit 10466, and the bytes corresponding to rows 7-0 and columns 3-0 are stored into 8 entries of the memory unit 10468.

The memory module 1046 is connected to the byte shuffling unit 1048, which consists of a memory read control unit 10482 and a multiplexer unit 10484. The memory read control unit 10482 is configured to access the 4 memory units 10462-10468 according to a byte mapping information of the image format of RG88, to output an accessed data, wherein the accessed entry of each of the 4 memory units 10462-10468 is different. Please refer to Table 6 and 7 below, which indicate the byte mapping information of the image format of RG88 and the multiplexing rules of the multiplexer unit 10484, respectively. The notation "C0-C7" represents cycle 0-cycle 7.

TABLE 6

| | memory unit 10462 | memory unit 10464 | memory unit 10466 | memory unit 10468 |
|---|---|---|---|---|
| C7 | 7 | 7 | 3 | 3 |
| C6 | 3 | 3 | 7 | 7 |
| C5 | 6 | 6 | 2 | 2 |
| C4 | 2 | 2 | 6 | 6 |
| C3 | 5 | 5 | 1 | 1 |
| C2 | 1 | 1 | 5 | 5 |
| C1 | 4 | 4 | 0 | 0 |
| C0 | 0 | 0 | 4 | 4 |

TABLE 7

| | byte order | | | | | | | | | | | | | | | |
|---|---|---|---|---|---|---|---|---|---|---|---|---|---|---|---|---|
| C7 | 15 | 14 | 7 | 6 | 13 | 12 | 5 | 4 | 11 | 10 | 3 | 2 | 9 | 8 | 1 | 0 |
| C6 | 7 | 6 | 15 | 14 | 5 | 4 | 13 | 12 | 3 | 2 | 11 | 10 | 1 | 0 | 9 | 8 |
| C5 | 15 | 14 | 7 | 6 | 13 | 12 | 5 | 4 | 11 | 10 | 3 | 2 | 9 | 8 | 1 | 0 |
| C4 | 7 | 6 | 15 | 14 | 5 | 4 | 13 | 12 | 3 | 2 | 11 | 10 | 1 | 0 | 9 | 8 |
| C3 | 15 | 14 | 7 | 6 | 13 | 12 | 5 | 4 | 11 | 10 | 3 | 2 | 9 | 8 | 1 | 0 |
| C2 | 7 | 6 | 15 | 14 | 5 | 4 | 13 | 12 | 3 | 2 | 11 | 10 | 1 | 0 | 9 | 8 |
| C1 | 15 | 14 | 7 | 6 | 13 | 12 | 5 | 4 | 11 | 10 | 3 | 2 | 9 | 8 | 1 | 0 |
| C0 | 7 | 6 | 15 | 14 | 5 | 4 | 13 | 12 | 3 | 2 | 11 | 10 | 1 | 0 | 9 | 8 |

For cycle 0, the entry 0 of the memory unit 10462, the entry 0 of the memory unit 10464, the entry 4 of the memory unit 10466, and the entry 4 of the memory unit 10468 are read out respectively in accordance with Table 6, i.e. {f7-f0 and f15-f8}, and the 4 DOWRDs are inputted into the multiplexer unit 10484. The resultant shuffled data d_sf is finally generated as {f71, f70, f7, f6, f69, f68, f5, f4, f67, f66, f3, f2, f65, f64, f1 and f0} under the control of a multiplexer control signal which operates in accordance with the byte order of cycle 0, {7, 6, 15, 14, 5, 4, 13, 12, 3, 2, 11, 10, 1, 0, 9, 8}, shown in the last row in Table 7.

For cycle 1, the entry 4 of the memory unit 10462, the entry 4 of the memory unit 10464, the entry 0 of the memory unit 10466, and the entry 0 of the memory unit 10468 are read out respectively in accordance with Table 6, i.e. {f79-f72 and f15-f8}, and the 4 DOWRDs are inputted into the multiplexer unit 10484. The resultant shuffled data d_sf is finally generated as {f79, f78, f15, f14, f77, f76, f13, f12, f75, f74, f11, f10, f73, f72, f9 and f8} under the control of a multiplexer control signal which operates in accordance with the byte order of cycle 1, {15, 14, 7, 6, 13, 12, 3, 5, 4, 11, 10, 3, 2, 9, 8, 1, 0,}, shown in the penultimate row in Table 7.

For cycle 2, the entry 1 of the memory unit 10462, the entry 1 of the memory unit 10464, the entry 5 of the memory unit 10466, and the entry 5 of the memory unit 10468 are read out respectively in accordance with Table 6, i.e. {f23-f16 and f87-f80}, and the 4 DOWRDs are inputted into the multiplexer unit 10484. The resultant shuffled data d_sf is finally generated as {f87, f86, f23, f22, f85, f84, f21, f20, f83, f82, f19, f18, f81, f80, f17 and f16} under the control of a multiplexer control signal which operates in accordance with the byte order of cycle 0, {7, 6, 15, 14, 5, 4, 13, 12, 3, 2, 11, 10, 1, 0, 9, 8}, shown in the bottom third row in Table 7.

Since the shuffled data d_sf for following cycle 3-7 can be obtained by referring to Table 6 and Table 7, the detailed descriptions are omitted here for brevity. By observing the outputting pattern of the shuffled data d_sf from cycle 0 to cycle 7, it can be found that the data rearrangement formulated as (2.b) is indeed achieved. Take the outputting of d_sf in cycle 7 for example, during this cycle, two bytes {f63, f62} indicated as RG88_data[511:496] in (2.b) are inserted to be outputted between {f127, f126} and {f125, f124} that respectively represent RG88_data[1023:1008] and R8_data [1007:992] in (2.b). Thus, the aforementioned hardware operation does implement the data shuffling according to the relationship between the RG88 and RGBA8 pixel formats.

Lastly, the compression module 106 suitable/fine-tuned for compressing image data in the pixel format of RGBA8 is configured to compress the shuffled data d_sf to generate the compressed data d_cp. According to previous disclosure, the resultant compression ratio is considerably improved to 50.38% as compared with 36.50% derived by feeding directly the image data d_in of RG88 to the compression module 106.

In the scenario where the image data d_in has a pixel format of RGB565, the control unit 1049 determines that the bit shuffling unit 1042 is required to transform from the pixel format of RGB565 to the pixel format of RGBA8. This is because bit level shuffling is present in (3). A bit shuffling sub-unit 10422, a bit shuffling sub-unit 10424, a bit shuffling sub-unit 10426, and a bit shuffling sub-unit 10428 of the bit shuffling unit 1042 are operative to rearrange the inputted image data d_in in accordance with the aforementioned method (i.e. the bit level shuffling order of each 16-bits is {10, 15, 14, 8, 13, 12, 6, 11, 4, 9, 3, 2, 7, 1, 0, 5}), and then output the result to the DWORD shuffling unit 1044. The following procedures are the same as that of the pixel format of RG88 since the resultant output of the bit shuffling unit 1042 can be treated like RG88. In this way, the same process, the same DWORD mapping information and the same byte mapping information associated with the pixel format of RG88 mentioned in the previous paragraphs can also be applied here.

In the scenario where the image data d_in has a pixel format of RGBA4, the control unit 1049 determines that the bit shuffling unit 1042 is required for transformation to the pixel format of RGBA8. This is because bit level shuffling is present in (4). Hence, the bit shuffling sub-unit 10422, the bit shuffling sub-unit 10424, the bit shuffling sub-unit 10426, and the bit shuffling sub-unit 10428 of the bit shuffling unit 1042 are operative to rearrange the inputted image data d_in in accordance with the aforementioned method (i.e. the bit level shuffling order of each 32-bits is {31, 27, 30, 26, 29, 25, 28, 24, 23, 19, 22, 18, 21, 17, 20, 16, 15, 11, 14, 10, 13, 9, 12, 8, 7, 3, 6, 2, 5, 1, 4, 0}), and then output the result to the DWORD shuffling unit 1044. The following procedures are the same as that of the pixel format of RG88 since the resultant output of the bit shuffling unit 1042 can be treated in the same way as RG88. The same process, the same DWORD mapping information and the same byte mapping information associated with the pixel format of RG88 mentioned in the previous paragraphs can be applied here.

In the foregoing disclosure, examples of detailed hardware operation of how some different pixel formats in Table 1 are shuffled to a particular pixel format are given. Other pixel formats in Table 1 are not described for the sake of brevity as it is not hard to conceive how the disclosed embodiments of hardware can support these different pixel formats. Please refer to Table 14 below, which summarizes compression ratios obtained by applying the compression module suitable for the RGBA8 format upon other image formats after data shuffling.

TABLE 14

| bpp | Sized Internal Format | data' [1023:0] | Compression Ratio |
|---|---|---|---|
| 8 | R8 | R8_data' [32* (32-n) -1:32* (32-n-1)] = { R8_data[1023-8n:1016-8n], R8_data[767-8n:760-8n], R8_data[511-8n:504-8n], R8_data[255-8n:248-8n]}, for n = 0-31 | 50.60% |
| 16 | RG88 | RG88_data' [32* (32-n) -1:32* (32-n-1)] = { RG88_data[1023-16n:1008-16n], RG88 data[511-16n:496-16n]}, for n = 0-31 | 50.38% |
| 16 | RGB565 | shuffle to {G[5], R[4], R[3], G[3], R[2], R[1] G[1], R[0], B[4], G[4], B[3], B[2], G[2], B[1], B[0], G[0]}, and apply RG88 formula | 51.63% |
| 16 | RGBA4 | shuffle to {R[3], G[3], R[2], G[2], R[1], G[1], R[0], G[0], B[3], A[3], B[2], A[2], B[1], A[1], B[0], A[0]}, and apply RG88 formula | 64.41% |
| 16 | RGB5_A1 | shuffle to {R[4], G[4], R[3], R[2], G[2], R[1], R[0], G[0], B[4], B[3], G[3], B[2], B[1], G[1], B[0], A[0]}, and apply RG88 formula | 54.13% |
| 32 | RGBA8 | | 60.02% |
| 32 | RGB10_A2 | shuffle to {R[9:2], G[9:2], B[9:2], R[1], G[1], B[1], A[1], R[0], G[0], B[0], A[0]}, and use as RGBA8 | 55.45% |
| 16 | R16F | shuffle to {R[15:10], R[1:0], R[9:2]}, and apply RG88 formula | 54.96% |
| 32 | RG16F | Shuffle to {R[15:10], R[1:0], R[9:2], G[15:10], G[1:0], G[9:2]}; and use as RGBA8 | 54.60% |
| 64 | RGBA16F | RGBA32F_data' [32* (32-m) -1.32* (32-m-1)] = RGBA16F_data[1023-64m:992-64m], for m = 0-15 RGBA16F_data' [32* (16-n) -1:32* (16-n-1)] = RGBA16F_data[991-64n:960-64n], for n = 0-15, and apply RG16F formula | 54.20%)] = |
| 32 | R32F | use as RGBA8 | 51.73% |
| 64 | RG32F | RGBA32F_data' [32* (32-m) -1:32* (32-m-1)] = RG32F_data[1023-64m:992-64m], for m= 0-15 RGBA32F_data' [32* (16-n) -1:32* (16-n-1)] = RG32F data[991-64n:960-64n], for n = 0-15, and apply RG32F formula | 49.20%= |
| 128 | RGBA32F | RGBA32F_data' [32* (32-m) -1:32* (32-m-1)] = RGBA32F_data[1023-128m:992-128m], for m = 0-7 RGBA32F_data' [32* (24-n) -1:32* (24-n-1)] = RGBA32F_data[991-128n:960-128n], for n = 0-7 | 45.67%)] = |

TABLE 14-continued

| bpp | Sized Internal Format | data' [1023:0] | Compression Ratio |
|---|---|---|---|
| | | RGBA32F_data' [32* (16-p) -1:32* (16-p-1)] = RGBA32F_data[959-128p:928-128p], for p = 0-7 RGBA32F_data' [32* (8-q) -1:32* (8-q-1)] = RGBA32F_data[927-128q:896-128q], for q = 0-7, and apply R32F formula | |

Please note that the image data processing method of shuffling the pixel formats of R8, RG88, RGB565, RGBA4, RGB5_A1, RGB10_A2, R16F, RG16F, RGBA16F, R32F, RG32F, RGBA8 and RGBA32F mentioned in the previous paragraphs are for illustrative purposes only. In practice, the invention can be applied to any other type of pixel formats without departing from the spirit of the invention. Also, the compression engine may be suitable for other pixel formats instead of RGBA8. Those skilled in the art should readily appreciate that numerous modifications and alterations of the device and method may be made while retaining the teachings of the invention. These modifications and alterations all fall within the scope of the invention.

Figure 2:
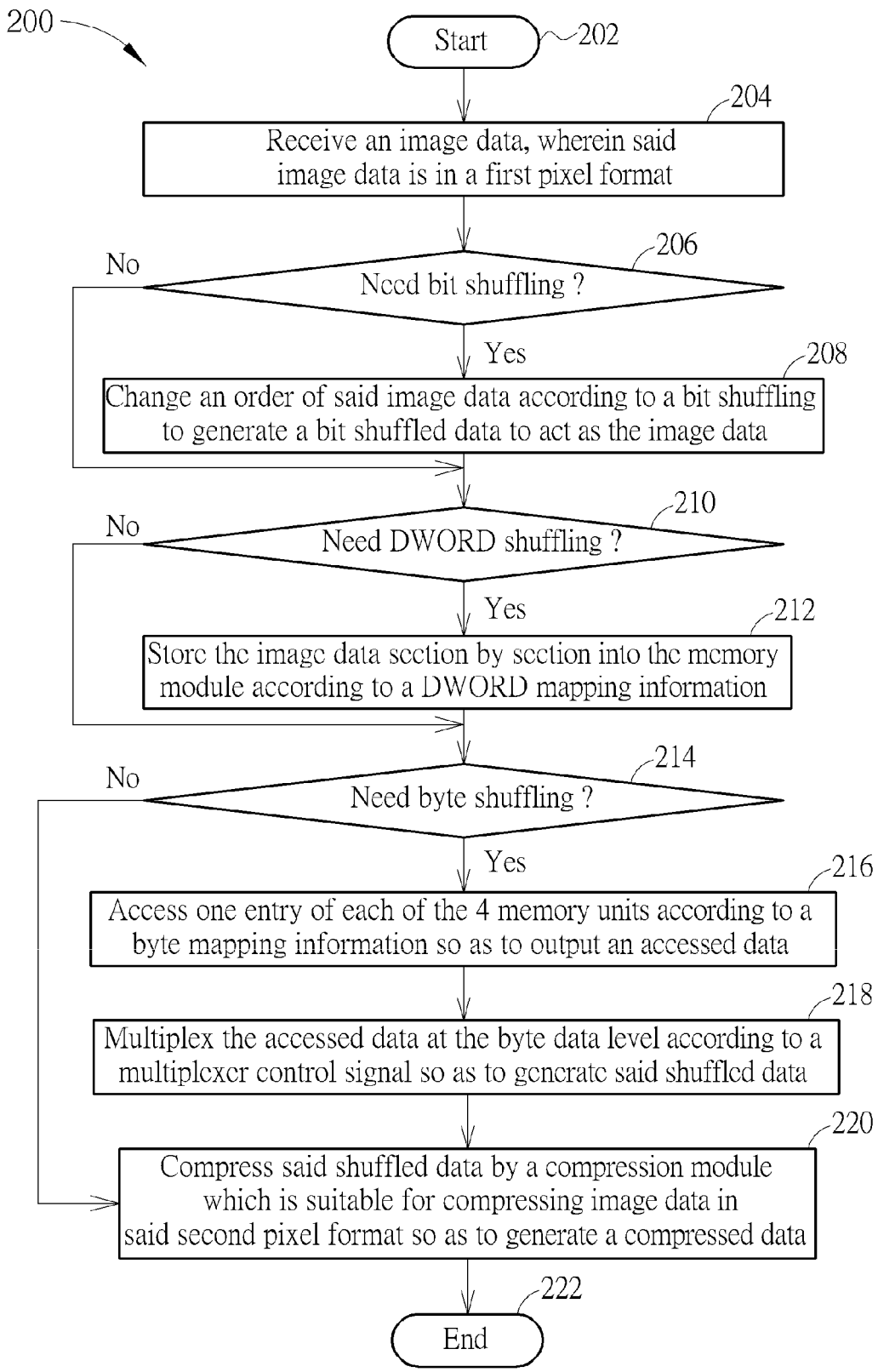
FIG. 2 is a flowchart illustrating an image data processing method according to an embodiment of the invention.

FIG. 2 is a flowchart illustrating an image data processing method 200 according to an embodiment of the invention. Provided that substantially the same result is achieved, the steps of the flowchart shown in FIG. 2 need not be in the exact order shown and need not be contiguous; that is, other steps can be intermediate. Some steps in FIG. 2 may be omitted according to various embodiments or requirements. The image data processing method 400 may include the following steps.

Step 202: Start.

Step 204: Receive image data, wherein the image data is in a first pixel format.

Step 206: Need bit shuffling? If yes, go to step 208; otherwise, go to step 210.

Step 208: Change an order of the image data according to a bit shuffling to generate bit shuffled data to act as the image data.

Step 210: Need DWORD shuffling? If yes, go to step 212; otherwise, go to step 214.

Step 212: Store the image data section by section into the memory module according to a DWORD mapping information.

Step 214: Need byte shuffling? If yes, go to step 216; otherwise, go to step 220.

Step 216: Access one entry of each of the 4 memory units according to a byte mapping information to output accessed data.

Step 218: Multiplex the accessed data at the Byte data level according to a multiplexer control signal to generate the shuffled data.

Step 220: Compress the shuffled data by a compression module which is suitable for compressing image data in the second pixel format to generate compressed data.

Step 222: End.

As a person skilled in the art can readily understand details of each step shown in FIG. 2 after reading the above paragraphs directed to the image data processing apparatus 100 shown in FIG. 1, further description is omitted here for brevity.

In practice, the compressed data may be stored in a cache or any data storage components for further processing. For some applications, it may be necessary that the compressed data is decompressed and recovered to different pixel formats. Please refer to FIG. 3, which is a diagram illustrating an image data processing apparatus 300 according to an embodiment of the invention. The image data processing apparatus 300 comprises a decompression module 302 and a data de-shuffling module 304, wherein the decompressing module 302 is configured to decompress compressed image data d_cp in a RGBA8-like pixel format so as to generate decompressed image data d_sf. The data de-shuffling module 304 is configured to de-shuffle the decompressed image data d_sf according to a relationship between a first pixel format and the second pixel format, RGBA8, to generate image data din, wherein the first pixel format may be one of the pixel formats of R8, RG88, RGB565, RGBA4, RGB5_A1, RGB10_A2, R16F, RG16F, RGBA16F, R32F, RG32F, RGBA8 and RGBA32F. Please note that the pixel format of RGBA8 is employed here as the second pixel format to represent a general case. In an alternative design, the decompression module 302 may be suitable fine-tuned for performing data compressing of image data not in the RGBA8 pixel format. Persons of ordinary skill in the art should readily observe that numerous modifications and alterations of the device and method may be made while retaining the teachings of the invention.

The data de-shuffling module 304 comprises a byte de-shuffling unit 3048, a memory module 3046, a DWORD de-shuffling unit 3044, and a bit de-shuffling unit 3042. As an example, the image data d_in comprises 8 sections, where each of the 8 sections includes 4 sub-sections. The memory module 3046 includes 4 memory units 30462-30468, where each memory unit 30462-30468 includes 8 entries, and each entry is capable of storing one of the sub-sections of the image data d_in. The byte de-shuffling unit 3048 is configured to perform a byte de-shuffling for changing an order of the decompressed image data d_sf to generate a byte de-shuffled image data. The byte de-shuffling unit 3048 includes a demultiplexer unit 30484 and a memory write control unit 30482, wherein the demultiplexer unit 30484 is configured to demultiplex the decompressed image data d_sf at the byte level according to a demultiplexer control signal to generate a demultiplexed data. The memory write control unit 30482 is configured to access one entry of each of the 4 memory units 30462-30468 according to a byte mapping information to store the demultiplexed data, wherein the accessed entry in each of the 4 memory units 30462-30468 is different. The DWORD de-shuffling unit 3044 is configured to perform a DWORD de-shuffling for changing an order of the byte de-shuffled image data to generate a DWORD de-shuffled image data. The bit de-shuffling unit 3042 is configured to perform a bit de-shuffling for changing an order of the DWORD de-shuffled image data to generate the image data d_in. The DWORD de-shuffling unit 3044 includes a memory read control unit 30442, which is configured to output the byte de-shuffled image data from the memory module according to a DWORD mapping information, wherein the DWORD mapping information corresponds the second de-shuffled image data from a same entry of each of the 4 memory units 30462-30468 to 4 sub-sections of one of the 8 sections of the image data.

The image data processing apparatus 100 may be employed by a transmitting end, and the image data processing apparatus 300 may be employed in a receiving end. More specifically, the image data processing apparatus 300 should be designed based on the design of the image data processing apparatus 100, and is arranged to perform a reverse operation (i.e. de-compression and de-shuffling) of the operation performed by the image data processing apparatus 100 (i.e. shuffling and compression) to recover the image data d_in fed into the image data processing apparatus 100. As a person skilled in the art can readily understand details of each module shown in FIG. 3 after reading the above paragraphs directed to the image data processing apparatus 100 shown in FIG. 1, further description is omitted here for brevity.

Figure 4:
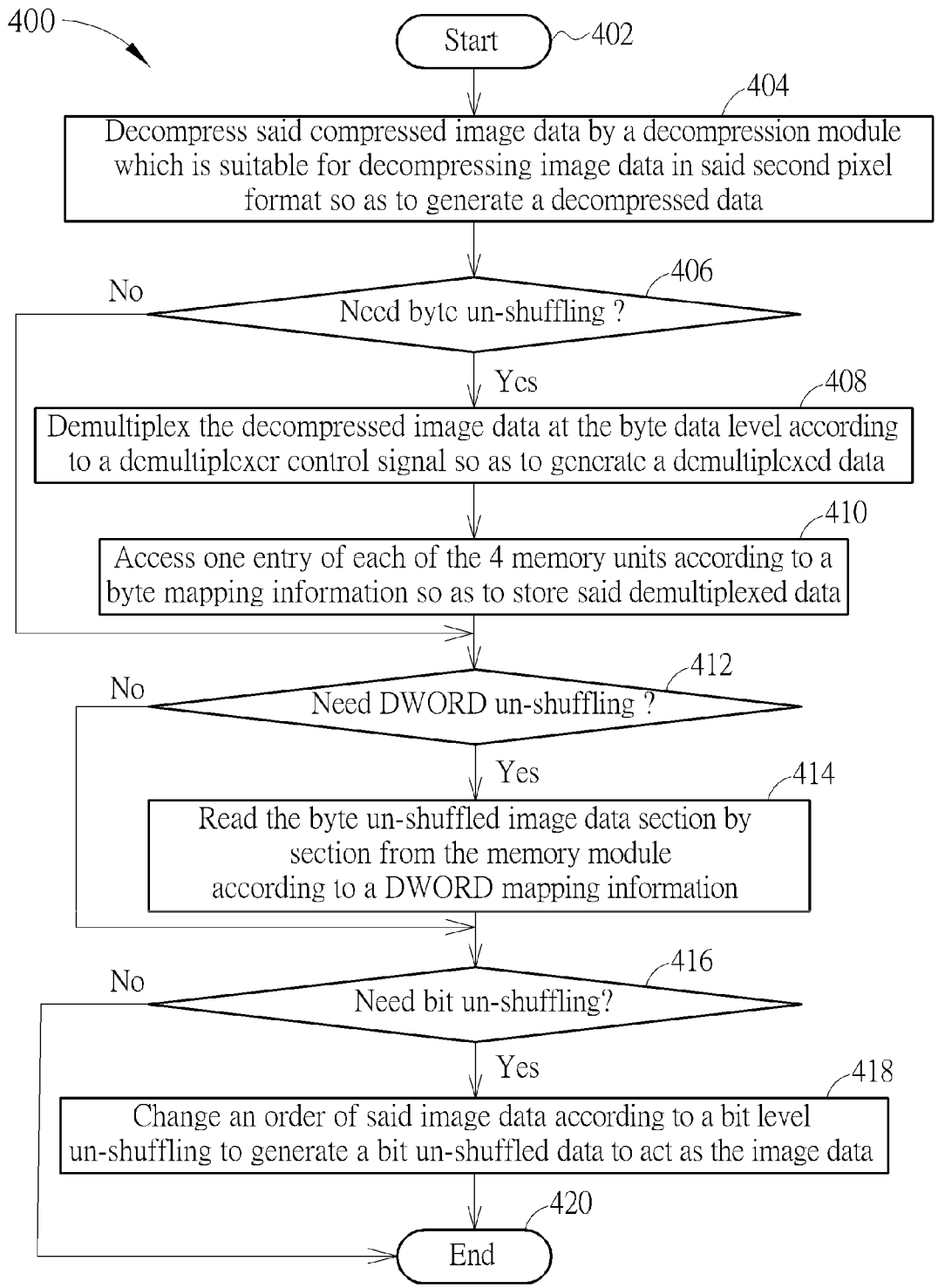
FIG. 4 is a flowchart illustrating an image data processing method according to an embodiment of the invention.

FIG. 4 is a flowchart illustrating an image data processing method 400 according to an embodiment of the invention. Provided that substantially the same result is achieved, the steps of the flowchart shown in FIG. 4 need not be in the exact order shown and need not be contiguous; that is, other steps can be intermediate. Some steps in FIG. 4 may be omitted according to various embodiments or requirements. The image data processing method 400 may include the following steps.

Step 402: Start.

Step 404: Decompress the compressed image data by a decompression module which is suitable for decompressing image data in the second pixel format to generate a decompressed data.

Step 406: Need byte de-shuffling? If yes, go to step 406; otherwise, go to step 412.

Step 408: Demultiplex the decompressed image data at the byte data level according to a demultiplexer control signal to generate a demultiplexed data.

Step 410: Access one entry of each of the 4 memory units according to a byte mapping information to store the demultiplexed data.

Step 412: Need DWORD de-shuffling? If yes, go to step 414; otherwise, go to step 416.

Step 414: Read the byte de-shuffled image data section by section from the memory module according to a DWORD mapping information.

Step 416: Need bit de-shuffling? If yes, go to step 418; otherwise, go to step 420.

Step 418: Change an order of the image data according to a bit level de-shuffling to generate a bit de-shuffled data to act as the image data.

Step 420: End.

Figure 3:
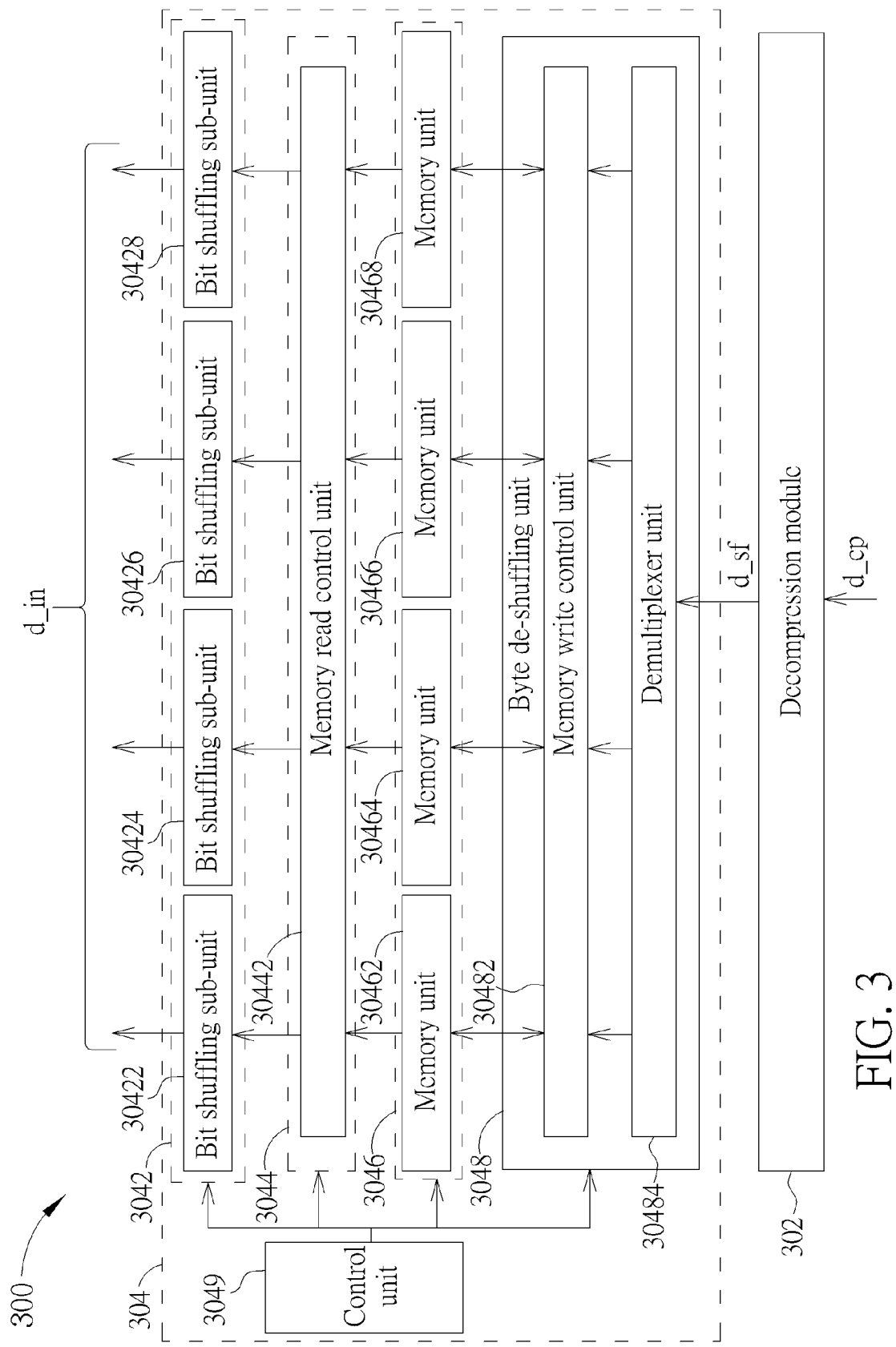
FIG. 3 is a diagram illustrating an image data processing apparatus according to an embodiment of the invention.

As a person skilled in the art can readily understand details of each step shown in FIG. 4 after reading the above paragraphs directed to the image data processing apparatus 300 shown in FIG. 3, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image data processing method, comprising:
   (a) receiving image data, wherein said image data is in a first pixel format;
   (b) shuffling said image data according to a relationship between the first pixel format and a second pixel format to generate shuffled data; and
   (c) compressing said shuffled data by a compression module which is suitable for compressing data in said second pixel format to generate compressed data having a first compression ratio, wherein the first compression ratio is higher than a second compression ratio associated with compressing said image data using said compression module regardless of contents of said image data;
   wherein said step (b) comprises:
   (b1) changing an order of said image data according to a first data level shuffling to generate first shuffled data; and
   (b2) changing an order of said first shuffled data according to a second data level shuffling to generate said shuffled data, wherein said first data level has a data length greater than that of said second data level;
   wherein the image data comprises N sections, each of the N sections comprising M sub-sections, wherein a memory module comprises M memory units, each memory unit comprising N entries and each entry capable of storing one of the sub-sections of the image data, and wherein said first data level shuffling comprises:
   storing the image data section by section into the memory module according to a first mapping information, wherein the first mapping information corresponds the M sub-sections of one of the N sections of the image data to the same entry of the M memory units;
   wherein said second shuffling circuit comprises:
   accessing one entry of each of the M memory units according to a second mapping information so as to output accessed data, wherein the accessed entry of each of the M memory units is different; and
   multiplexing the accessed data at the second data level according to a multiplexer control signal so as to generate said shuffled data.

2. The image data processing method according to claim 1, wherein the first pixel format is one of the pixel formats of R8, RG88, RGB565, RGBA4, RGB5_A1, RGB10_A2, R16F, RG16F, RGBA16F, R32F, RG32F, RGBA8 and RGBA32F.

3. The image data processing method according to claim 1, wherein said step (b) comprises:
   changing an order of said image data according to a third data level shuffling to generate third shuffled data;
   changing an order of said third shuffled data according to a first data level shuffling to generate first shuffled data; and
   changing an order of said first shuffled data according to a second data level shuffling to generate said shuffled data, wherein said third data level has a data length smaller than that of said second data level and said second data level has a data length smaller than that of said first data level.

4. An image data processing apparatus, comprising:
   a receiving circuit for receiving image data in a first pixel format;

a data shuffling circuit, configured to shuffle said image data according to a relationship between the first pixel format and a second pixel format to generate shuffled data; and a compression circuit, configured to compress said shuffled data to generate compressed data having a first compression ratio higher than a second compression ratio associated with compressing said image data using said compression circuit regardless of contents of said image data, wherein the compression circuit is suitable for compressing data in said second pixel format;

wherein said data shuffling circuit comprises:

a first shuffling circuit, configured to perform a first data level shuffling for changing an order of said image data to generate first shuffled data; and a second shuffling circuit, configured to perform a second data level shuffling for changing an order of said first shuffled data to generate said shuffled data, wherein said first data level has a data length greater than that of said second data level;

wherein the image data comprises N sections, each of the N sections comprising M sub-sections, wherein a memory module comprises M memory units, each memory unit comprising N entries and each entry capable of storing one of the sub-sections of the image data, and wherein said first shuffling circuit comprises:

a memory write control circuit, configured to receive the image data and store the image data section by section into the memory module according to a first mapping information, wherein said first mapping information corresponds the M sub-sections of one of the N sections of the image data to the same entry of the M memory units;

wherein said second shuffling circuit comprises:

a memory read control circuit, configured to access the M memory units according to a second mapping information so as to output an accessed data, wherein the accessed entry of each of the M memory units is different; and a multiplexer circuit, configured to multiplex the accessed data at the second data level according to a multiplexer control signal so as to generate said shuffled data.

5. The image data processing apparatus according to claim 4, wherein said first pixel format is one of the pixel formats of R8, RG88, RGB565, RGBA4, RGB5_A1, RGB10_A2, R16F, RG16F, RGBA16F, R32F, RG32F, RGBA8 and RGBA32F.

6. The data processing apparatus according to claim 4, wherein said data shuffling circuit comprises:

a third shuffling circuit, configured to perform a third data level shuffling for changing an order of said image data to generate third shuffled data;

a first shuffling circuit, configured to perform a first data level shuffling for changing an order of said third shuffled data to generate first shuffled data; and a second shuffling circuit, configured to perform a second data level shuffling for changing an order of said first shuffled data to generate said shuffled data, wherein said third data level has a data length smaller than that of said second data level and said second data level has a data length smaller than that of said first data level.

7. An image data processing method, comprising:

(a) receiving compressed image data compressed from decompressed image data at a first compression ratio;

(b) decompressing said compressed image data by a decompression module which is suitable for decompressing data in a second pixel format so as to generate said decompressed image data; and (c) de-shuffling said decompressed image data according to a relationship between a first pixel format and said second pixel format to generate image data, wherein the first compression ratio is higher than a second compression ratio associated with directly compressing the image data regardless of contents of the image data;

wherein said step (c) comprises:

(c1) changing an order of said decompressed image data according to a second data level de-shuffling to generate second de-shuffled image data; and (c2) changing an order of said second de-shuffled image data according to a first data level de-shuffling to generate the image data, wherein said first data level has a data length greater than that of said second data level;

wherein the image data comprises N sections, each of the N sections comprising M sub-sections, wherein a memory module comprises M memory units, each memory unit comprising N entries and each entry capable of storing one of the sub-sections of the image data, and wherein said second data level de-shuffling comprises:

demultiplexing the decompressed image data at the second data level according to a demultiplexer control signal so as to generate demultiplexed data; and accessing one entry of each of the M memory units according to a second mapping information so as to store said demultiplexed data, wherein the accessed entry of each of the M memory units is different;

wherein said first data level de-shuffling comprises:

reading said second de-shuffled image data from the memory module according to a first mapping information to generate the image data section by section, wherein the first mapping information corresponds the second de-shuffled image data from a same entry of each of the M memory units to M sub-sections of one of the N sections of the image data.

8. The image data processing method according to claim 7, wherein the first pixel format is one of the pixel formats of R8, RG88, RGB565, RGBA4, RGB5_A1, RGB10_A2, R16F, RG16F, RGBA16F, R32F, RG32F, RGBA8 and RGBA32F.

9. The image data processing method according to claim 7, wherein said step (c) comprises:

(c1) changing an order of said decompressed image data according to a second data level de-shuffling to generate second de-shuffled image data;

(c2) changing an order of said second de-shuffled image data according to a first data level de-shuffling to generate first de-shuffled image data; and (c3) changing an order of said first de-shuffled image data according to a third data level de-shuffling to generate the image data, wherein said third data level has a data length smaller than that of said second data level and said second data level has a data length smaller than that of said first data level.

10. An image data processing apparatus, comprising:

a receiving circuit, configured to receive compressed image data compressed from decompressed image data at a first compression ratio;

a decompressing circuit, suitable for decompressing data in a second pixel format, configured to decompress the compressed image data so as to generate said decompressed image data; and a data de-shuffling circuit, configured to de-shuffle said decompressed image data according to a relationship between a first pixel format and said second pixel format to generate image data, wherein the first compression ratio is higher than a second compression ratio associated with directly compressing the image data regardless of contents of the image data;

wherein said data de-shuffling circuit comprises:

a second data level de-shuffling circuit, configured to perform a second data level de-shuffling for changing an order of said decompressed image data to generate second de-shuffled image data; and a first data level de-shuffling circuit, configured to perform a first data level de-shuffling for changing an order of said second de-shuffled image data to generate the image data, wherein said first data level has a data length greater than that of said second data level;

wherein the image data comprises N sections, each of the N sections comprising M sub-sections, wherein a memory module comprises M memory units, each memory unit comprising N entries and each entry capable of storing one of the sub-section of the image data, and wherein said second data level de-shuffling circuit comprises:

a demultiplexer circuit, configured to demultiplex the decompressed image data at the second data level according to a demultiplexer control signal so as to generate demultiplexed data; and a memory write control circuit, configured to access one entry of each of the M memory units according to a second mapping information so as to store said demultiplexed data, wherein the accessed entry of each of the M memory units is different;

wherein said first data level de-shuffling circuit comprises:

a memory read control circuit, configured to read said second de-shuffled image data from the memory module according to a first mapping information to generate the image data section by section, wherein the first mapping information corresponds the second de-shuffled image data from a same entry of each of the M memory units to M sub-sections of one of the N sections of the image data.

11. The image data processing apparatus according to claim 10, wherein the first pixel format is one of the pixel formats of R8, RG88, RGB565, RGBA4, RGB5_A1, RGB10_A2, R16F, RG16F, RGBA16F, R32F, RG32F, RGBA8 and RGBA32F.

12. The image data processing apparatus according to claim 10, wherein said data de-shuffling circuit comprises:

a second data level de-shuffling circuit, configured to perform a second data level de-shuffling for changing an order of said decompressed image data to generate second de-shuffled image data;

a first data level de-shuffling circuit, configured to perform a first data level de-shuffling for changing an order of said second de-shuffled image data to generate first de-shuffled image data; and a third data level de-shuffling circuit, configured to perform a third data level de-shuffling for changing an order of said first de-shuffled image data to generate the image data, wherein said third data level has a data length smaller than that of said second data level and said second data level has a data length smaller than that of said first data level.

* * * * *